United States Patent
Agarwal et al.

(10) Patent No.: US 9,143,942 B2
(45) Date of Patent: Sep. 22, 2015

(54) METHODS, SYSTEMS, AND COMPUTER READABLE MEDIA FOR PROVIDING A MULTI-NETWORK EQUIPMENT IDENTITY REGISTER

(71) Applicant: Tekelec Global, Inc., Morrisville, NC (US)

(72) Inventors: Devesh Agarwal, Cary, NC (US); Ramesh Chellamani, Cary, NC (US); Mark Allen Erickson, Raleigh, NC (US)

(73) Assignee: TEKELEC GLOBAL, INC., Morrisville, NC (US)

( * ) Notice: Subject to any disclaimer, the term of this patent is extended or adjusted under 35 U.S.C. 154(b) by 0 days.

(21) Appl. No.: 14/212,291

(22) Filed: Mar. 14, 2014

(65) Prior Publication Data

US 2014/0273968 A1 Sep. 18, 2014

Related U.S. Application Data

(60) Provisional application No. 61/784,694, filed on Mar. 14, 2013.

(51) Int. Cl.
*H04W 12/06* (2009.01)
*H04L 29/06* (2006.01)

(52) U.S. Cl.
CPC ........... *H04W 12/06* (2013.01); *H04L 63/0876* (2013.01); *H04L 63/101* (2013.01)

(58) Field of Classification Search
CPC .... H04M 1/663; H04W 12/06; H04L 67/306; H04L 63/102; H04L 63/0876; H04L 63/101
See application file for complete search history.

(56) References Cited

U.S. PATENT DOCUMENTS 4,310,727 A  1/1982 Lawser
4,754,479 A  6/1988 Bicknell et al.
(Continued)

FOREIGN PATENT DOCUMENTS

EP  0 512 962 A2  11/1992
EP  0 936 825 A3  8/1999
(Continued)

OTHER PUBLICATIONS

Applicant-Initiated Interview Summary for U.S. Appl. No. 13/751,027 (Nov. 17, 2014).
(Continued)

*Primary Examiner* — Ajit Patel
(74) *Attorney, Agent, or Firm* — Jenkins, Wilson, Taylor & Hunt, P.A.

(57) ABSTRACT

Methods, systems, and computer readable media for providing a multi-network equipment identity register are disclosed. According to one aspect, the subject matter described herein includes a system for providing a multi-network equipment identity register. A node in a telecommunications network receives from a requesting entity a request to check an identity of a user equipment, the request containing the identity of the user equipment, queries an EIR using the identity of the user equipment, receives a response from the EIR, and forwards the response to the requesting entity. The node includes first and second interfaces for receiving requests to check an identity of a user equipment in a first and second protocol, respectively, such that a user equipment that is blacklisted in a network that uses the first protocol is also blacklisted in a network that uses the second protocol.

20 Claims, 7 Drawing Sheets

(56) References Cited

U.S. PATENT DOCUMENTS

| | | |
|---|---|---|
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,353,331 A | 10/1994 | Emery et al. |
| 5,396,543 A | 3/1995 | Beeson, Jr. et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,583,914 A | 12/1996 | Chang et al. |
| 5,590,398 A | 12/1996 | Matthews |
| 5,594,942 A | 1/1997 | Antic et al. |
| 5,623,532 A | 4/1997 | Houde et al. |
| 5,664,005 A | 9/1997 | Emery et al. |
| 5,689,548 A | 11/1997 | Maupin et al. |
| 5,706,286 A | 1/1998 | Reiman et al. |
| 5,711,002 A | 1/1998 | Foti |
| 5,805,997 A | 9/1998 | Farris |
| 5,819,177 A | 10/1998 | Vucetic et al. |
| 5,819,178 A | 10/1998 | Cropper |
| 5,822,694 A | 10/1998 | Coombes et al. |
| 5,832,382 A | 11/1998 | Alperovich |
| 5,845,211 A | 12/1998 | Roach, Jr. |
| 5,850,604 A | 12/1998 | Dufour et al. |
| 5,854,982 A | 12/1998 | Chambers et al. |
| 5,862,481 A | 1/1999 | Kulkarni et al. |
| 5,878,347 A | 3/1999 | Joensuu et al. |
| 5,878,348 A | 3/1999 | Foti |
| 5,890,063 A | 3/1999 | Mills |
| 5,920,820 A | 7/1999 | Qureshi et al. |
| 5,953,662 A | 9/1999 | Lindquist et al. |
| 5,953,663 A | 9/1999 | Maupin et al. |
| 5,978,672 A | 11/1999 | Hartmaier et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,137,869 A | 10/2000 | Voit et al. |
| 6,138,016 A | 10/2000 | Kulkarni et al. |
| 6,138,017 A | 10/2000 | Price et al. |
| 6,138,023 A | 10/2000 | Agarwal et al. |
| H1921 H | 11/2000 | Fletcher et al. |
| 6,144,857 A | 11/2000 | Price et al. |
| 6,148,204 A | 11/2000 | Urs et al. |
| 6,178,181 B1 | 1/2001 | Glitho |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,411,632 B2 | 6/2002 | Lindgren et al. |
| 6,424,832 B1 | 7/2002 | Britt et al. |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,594,258 B1 | 7/2003 | Larson et al. |
| 6,606,491 B1* | 8/2003 | Peck .......................... 455/411 |
| 6,611,516 B1 | 8/2003 | Pirkola et al. |
| 6,643,511 B1 | 11/2003 | Rune et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,735,441 B1 | 5/2004 | Turgeon et al. |
| 6,738,636 B2 | 5/2004 | Lielbriedis |
| 6,748,057 B2 | 6/2004 | Ranalli et al. |
| 6,795,701 B1 | 9/2004 | Baker et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 7,010,002 B2 | 3/2006 | Chow et al. |
| 7,027,582 B2 | 4/2006 | Khello et al. |
| 7,079,524 B2 | 7/2006 | Bantukul et al. |
| 7,079,853 B2 | 7/2006 | Rathnasabapathy et al. |
| 7,221,952 B2 | 5/2007 | Cho et al. |
| 8,340,711 B1* | 12/2012 | Glass et al. ................ 455/552.1 |
| 2001/0030957 A1 | 10/2001 | McCann et al. |
| 2001/0040957 A1 | 11/2001 | McCann et al. |
| 2002/0173320 A1 | 11/2002 | Aitken et al. |
| 2003/0026289 A1 | 2/2003 | Mukherjee et al. |
| 2003/0081754 A1 | 5/2003 | Esparza et al. |
| 2003/0109271 A1 | 6/2003 | Lewis et al. |
| 2003/0193967 A1 | 10/2003 | Fenton et al. |
| 2003/0227899 A1 | 12/2003 | McCann |
| 2004/0003114 A1 | 1/2004 | Adamczyk |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2005/0239441 A1* | 10/2005 | Eronen ........................ 455/411 |
| 2007/0083470 A1* | 4/2007 | Bonner et al. .................. 705/51 |
| 2007/0275031 A1 | 11/2007 | Descombes et al. |
| 2008/0167035 A1 | 7/2008 | Buckley et al. |
| 2009/0221265 A1* | 9/2009 | Liu et al. ..................... 455/411 |
| 2010/0299451 A1 | 11/2010 | Yigang et al. |
| 2011/0116382 A1 | 5/2011 | McCann et al. |
| 2011/0130116 A1* | 6/2011 | Yin et al. ..................... 455/411 |
| 2012/0039312 A1 | 2/2012 | Narkar et al. |
| 2013/0155948 A1* | 6/2013 | Pinheiro et al. ............... 370/328 |
| 2013/0171990 A1 | 7/2013 | McCann et al. |

FOREIGN PATENT DOCUMENTS

| | | |
|---|---|---|
| EP | 0 944 276 A1 | 9/1999 |
| EP | 1 308 054 B1 | 3/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 00/35153 | 6/2000 |
| WO | WO 00/35155 | 6/2000 |
| WO | WO 00/35156 | 6/2000 |
| WO | WO 02/11462 A2 | 2/2002 |
| WO | WO 2004/006534 A1 | 1/2004 |
| WO | WO 2004/075507 A2 | 9/2004 |

OTHER PUBLICATIONS

Communication pursuant to Article 94(3) EPC for European Application No. 08 770 806.1 (Oct. 10, 2014).

Non-Final Office Action for U.S. Appl. No. 13/751,027 (Aug. 22, 2014).

"3rd Generation Partnership Project; Technical Specification Group Core Network and Terminals; InterWorking Function (IWF) between (56) References Cited

OTHER PUBLICATIONS

MAP based and Diameter based interfaces (Release 8)," 3GPP TS 29.305, V8.0.0, pp. 1-53 (Dec. 2008).
3rd Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, pp. 1-290 (Mar. 2013).
Commonly-assigned, co-pending U.S. Appl. No. 13/751,027 for "Methods, Systems, and Computer Readable Media for Providing Triggerless Equipment Identity Register (EIR) Service in a Diameter Network," (Unpublished, filed Jan. 25, 2013).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11)," 3GPP TS 29.272, V11.5.0, pp. 1-119 (Dec. 2012).
"3rd Generation Partnership Project; Technical Specification Group Services and System Aspects; General Packet Radio Service (GPRS); Service description; Stage 2 (Release 11)," 3GPP TS 23.060, V11.4.0, pp. 1-335 (Dec. 2012).
"Ericsson Unified Number Portability," (Downloaded from the Internet on Jan. 24, 2011).
Tsou et al., "Realm-Based Redirection in Diameter," draft-ietf-dime-realm-based-redirect-03, RFC 3588, pp. 1-6 (Jul. 12, 2010).
Korhonen et al., "Clarifications on the Routing of Diameter Requests Based on the Username and the Realm," RFC 5729, pp. 1-9 (Dec. 2009).
"3rd Generation Partnership Project; Technical Specification Group Services and System Aspects; Policy and charging control architecture (Release 8)," 3GPP TS 23.203, V8.1.1, pp. 1-87 (Mar. 2008).
"IP Multimedia Subsystem," printout from wikipedia.org, Wikimedia Foundation, Inc. (May 29, 2007).
"HP OpenCall Home Subscriber Server Software—Data Sheet", 4AA0-3360ENW Rev. 2, Hewlett-Packard Development Company, L.P. (Jul. 2006).
Schwarz, "ENUM Trial to Link Phone, Internet Addresses," (Mar. 22, 2005).
Peterson, "Telephone Number Mapping (ENUM) Service Registration for Presence Services," Network Working Group, RFC 3953 (Jan. 2005).
Notice of Opposition for European Application No. 01959313,6 (Dec. 3, 2004).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Peterson et al., "Using E.164 Numbers With the Session Initiation Protocol (SIP)," Network Working Group, RFC 3824, pp. 1-14 (Jun. 2004).
Decision to Grant a European Patent Pursuant to Article 97(2) EPC for European Application No. 01959313.6 (Jan. 26, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).
Notice of Allowance and Fee(s) Due for U.S. Appl. No. 09/626,590 (Dec. 22, 2003).
Communication under Rule 51(4) EPC for European Application No. 01959313.6 (Aug. 19, 2003).
Non-Final Office Action for U.S. Appl. No. 09/626,590 (Mar. 7, 2003).
Foster et al., "Number Portability in the Global Switched Telephone Network (GSTN): An Overview," Network Working Group, RFC 3482 (Feb. 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Loshin, "19.4: Network Address Translation," TCP/IP Clearly Explained, Fourth Edition, Morgan Kaufman Publishers, pp. 435-437 (2003).
Barry, "A Signal for Savings," Packet, Cisco Systems Users Magazine, vol. 14, No. 4, pp. Cover; 19-21; and 81 (Fourth Quarter 2002).
Notification of Transmittal of International Preliminary Examination Report for International Application No. PCT/US01/23833 (Oct. 18, 2002).
"Global Implementation of ENUM: A Tutorial Paper," International Telecommunication Union, Telecommunication Standardization Union, Study Group 2, (Feb. 8, 2002).
Notification of Transmittal of the International Search Report for International Application No. PCT/US01/23833 (Jan. 31, 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
"IP7 Secure Gateway Release 1.0," 910-2046-01 Revision A, pp. 1-66 (Nov. 1999).
Hamdi et al., "Voice Service Interworking for PSTN and IP Networks," IEEE Communications Magazine, pp. 104-111 (May 1999).
"Topsail Beach-SS7 Over IP-" Cisco Systems, Inc., pp. 1-16 (Copyright 1999).
"Feature Guide, LNP / LSMS," P/N 910-1598-01, Revision A, pp. 1-112 (Jan. 1998).
"Eagle Feature Guide," P/N 910-1225-01, Revision B, pp. 1-218 (Jan. 1998).
"Information, Network Element, Home Location Register Authentication Center," A30808-X3245-X31-1-7618, Siemens AG, pp. 1-80 (1998).
"Information, Network Element, Mobile-Services Switching Center/ Visitor Location Register," A30808-X3245-X31-1-7618, Siemens AG, pp. 1-98 (1998).

(56) References Cited

OTHER PUBLICATIONS

Smith, "Number Portability Pileup," Telephony, p. 22, 24, 26, (Jan. 6, 1997).

Jain et al., "Phone Number Portability for PCS Systems with ATM Backbones Using Distributed Dynamic Hashing," IEEE, vol. 15 (No. 1), p. 96-105, (Jan. 1997).

"Information, Signaling, Overview CCNC," A30808-X2769-X7-3-7618, Siemens AG, pp. 1-38 (1997).

Heinmiller, "Generic Requrements for SCP Application and GTT Function for Number Portability," Illinois Number Portability Workshop, p. 1-50, (Sep. 4, 1996).

International Telecommunication Union, "Series Q: Switching and Signalling: Specifications of Signalling Systems No. 7—Signalling Connection Control Part," p. 11-16 (Jul. 1996).

Rice, "SS7 Networks in a PCS World," Telephony, pp. 138, 140 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signalling Requirements for Number Portability," AT&T Network Systems, No. 1, p. 1-76, (Feb. 2, 1996).

"Information, Network Element, Mobile-Service Switching Center Visitor Location Register," A30808-X325-X17-1-7618, Siemens AG, pp. 1-92 (1996).

ETSI, Digital Cellular Telecommunications System (Phase 2+); Mobile Application (MAP) Specification, Global System for Mobile Communications, pp. 112-114 (1996).

Jain, et al., "A Hashing Scheme for Phone Number Portability in PCS Systems with ATM Backbones," Bell Communications Research, p. 593-597, (1996).

Bishop, "Freeing the network for Competition," Telecommunications, p. 75-80, (Apr. 1995).

"Information, Signaling, Overview CCNC," A30808-X2769-X6-1-7618, Siemens AG, pp. 1-62 (1995).

"Information, Network Element, Equipment Identity Register," A30808-X3245-X19-1-7618, Siemens AG, pp. 1-34 (1995).

"Information, Network Element, Home Location Register Authentication Center," A30808-X3245-X18-1-7618, Siemens AG, pp. 1-80 (1995).

Anonymous, "Zeichengabesysteme—Eine neue Generation für ISDN and intelligente Netze," Zeichengabesystem, Medien-Institut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network Interface Specification (CCSNIS Supporting SCCP and TCAP," Bell Communications Research, p. ii-xii, 1-1-C-22, (Mar. 1994).

Buckles, "Very High Capacity Signaling Trnsfer Point for Intelligent Network Servcies," DSC Communciations Corporation, p. 1308-1311, (1988).

"Diameter Overview," referenced from www.ulticom.com/html/products/signalware-diameter-reference-guide.asp (Publication date unknown).

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

Non-Final Office Action for U.S. Appl. No. 13/751,027 (Feb. 10, 2015).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272 V8.4.0, pp. 1-71 (Sep. 2009).

* cited by examiner

METHODS, SYSTEMS, AND COMPUTER READABLE MEDIA FOR PROVIDING A MULTI-NETWORK EQUIPMENT IDENTITY REGISTER

PRIORITY CLAIM

This application claims the benefit of U.S. Provisional Patent Application Ser. No. 61/784,694, filed Mar. 14, 2013, the disclosure of which is incorporated herein by reference in its entirety.

TECHNICAL FIELD

The subject matter described herein relates to methods and systems for controlling access of mobile equipment to a telecommunications network. More particularly, the subject matter described herein relates to methods, systems, and computer readable media for providing a multi-network equipment identity register (EIR).

BACKGROUND

When a mobile telephone is lost or stolen, telecommunications network operators would like to deny the stolen device access to their networks. Each third generation (3G) Global System Mobile Communications (GSM) telephone includes its own unique international mobile equipment identity number (IMEI). An equipment identity register (EIR) is a database (and/or a server hosting an EIR database) that stores IMEIs of stolen or suspicious mobile devices. The EIR may be queried to determine the status of a particular IMEI. If the particular IMEI is listed in the EIR database, that may indicate that the mobile device is stolen, and the querying node may take steps to bar that device from accessing the network. When a mobile device is denied access to a telecommunications network because its IMEI is listed in the EIR, that device is said to be "blacklisted." Blacklisting is intended to discourage the theft of mobile phones by providing a mechanism that renders stolen devices from being able to connect to the telecommunications network.

Originally developed for the GSM, network, the EIR could be queried by a mobile switching center (MSC) in a system signaling 7 (SS7) network. For example, the MSC could send an SS7 mobile application part (MAP) query, such as the "Check IMEI" command, to the EIR via the GSM F interface. MAP is one of the protocols in the SS7 suite of protocols and allows for the implementation of mobile network (GSM) signaling infrastructure.

With the rise of high-speed packet networks, telecommunications networks are migrating from the circuit-switched, SS7-based networks of the plain old telephone system (POTS) to packet-switched, Diameter-based networks, which are incompatible with legacy network components such as SS7-based EIRs. Thus, network operators that want to support 4G devices face unpleasant choices: if all network equipment is migrated to 4G, then the legacy EIR database must also be migrated to a node in the packet-based network. If the network operator wants to continue supporting both 3G and 4G devices, the network operator must provide and maintain two different EIR functions—an SS7-based EIR and a Diameter-based EIR.

In addition, when a device having multiple radio interfaces is stolen, the rightful owner must notify not only the network operator that maintains the EIR for one of the radio interfaces, he or she must also notify the network operator(s) that maintain an EIR for each of the other radio interfaces—which may not be the same network operator. As a result, in conventional systems, there is a real possibility that a stolen device may be blacklisted on a GSM network but not blacklisted on an LTE network, for example.

Accordingly, in light of these disadvantages associated with these two options, there exists a need for a mechanism that allows network operators to leverage their existing 3G EIRs so that they may be used by nodes in a 4G network. More specifically, there exists a need for a multi-network equipment identity register.

SUMMARY

According to one aspect, the subject matter described herein includes a system for providing a multi-network equipment identity register. The system includes a node in a telecommunications network that receives from a requesting entity a request to check an identity of a user equipment, the request containing an identity of a user equipment, and queries an EIR using the identity of the user equipment. The node receives a response from the EIR and forwards the response to the requesting entity. The node includes a first interface for receiving requests to check an identity of a user equipment in a first protocol and a second interface for receiving requests to check an identity of a user equipment in a second protocol, such that a user equipment that is blacklisted in a network that uses the first protocol is also blacklisted in a network that uses the second protocol.

According to another aspect, the subject matter described herein includes a method for providing a multi-network equipment identity register. The method includes, at a node in a telecommunications network: receiving from a requesting entity a request to check an identity of a user equipment, the request containing an identity of a user equipment; querying an EIR using the identity of the user equipment; receiving a response from the EIR; and forwarding the response to the requesting entity. The node includes a first interface for receiving requests to check an identity of a user equipment in a first protocol and a second interface for receiving requests to check an identity of a user equipment in a second protocol, such that a user equipment that is blacklisted in a network that uses the first protocol is also blacklisted in a network that uses the second protocol.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for providing a multi-network equipment identity register. Reference will now be made in detail to exemplary embodiments of the present invention, examples of which are illustrated in the accompanying drawings. Wherever possible, the same reference numbers will be used throughout the drawings to refer to the same or like parts.

Figure 1:
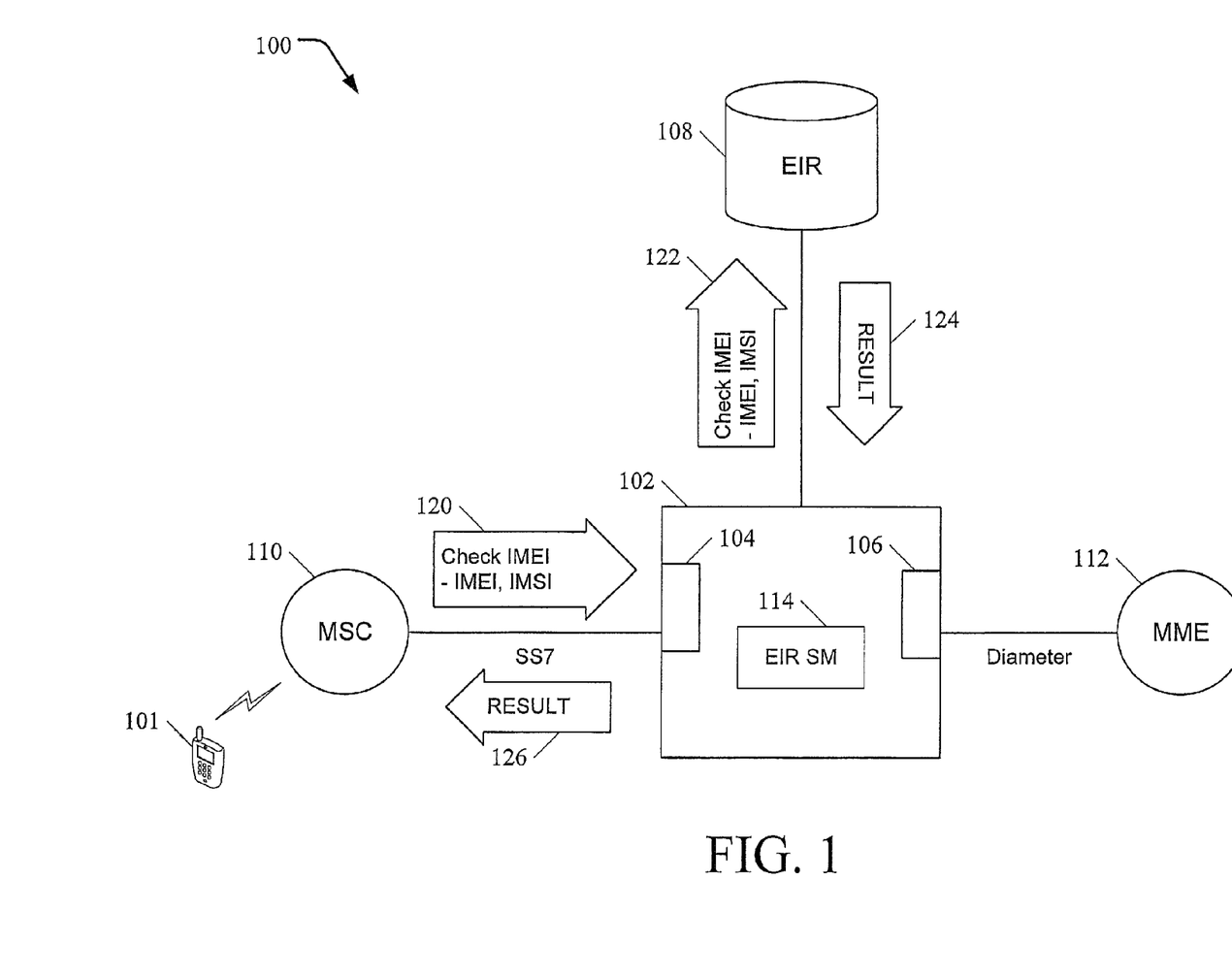
FIG. 1 is a block diagram illustrating an exemplary system for providing a multi-network EIR service according to an embodiment of the subject matter described herein.

FIG. 1 is a block diagram illustrating an exemplary system for providing a multi-network EIR according to an embodiment of the subject matter described herein. In the embodiment illustrated in FIG. 1, system 100 includes a network node 102 (e.g., a signaling transfer point (STP)) that is located in a telecommunications network and is communicatively connected to an equipment identity register (EIR) 108, e.g., an EIR database and/or a server hosting an EIR database. In one embodiment, EIR 108 may comprise and/or serve as a national EIR registry database.

In some embodiments, network node 102 may include a first interface 104 for receiving requests to check an identity of a user equipment (UE) in a first protocol and a second interface 106 for receiving requests to check an identity of a UE in a second protocol, wherein the first protocol and second protocol are distinct and different from each other. Although FIG. 1 depicts network node 102 as supporting two protocols via two interfaces, additional protocols and/or interfaces may be utilized without departing from the scope of the disclosed subject matter.

In some embodiments, network node 102 may include an EIR service module 114 that is configured to manage interfaces 104-106, to process received signaling messages (e.g., identity check request messages and EIR response messages), to query EIR 108, and the like. In the embodiment illustrated in FIG. 1, first interface 104 may be configured to support the SS7 protocol and second interface 106 may be configured to support the Diameter protocol. In some embodiments, first interface 104 supports the GSM/F protocol for communications between an MSC 110 and EIR 108 (e.g., a server or network node hosting an EIR database). In some embodiments, second interface 106 supports the Diameter S13 protocol to facilitate communication between a mobility management entity (MME) 112 and EIR 108 and/or the Diameter S13' protocol for facilitating the communication between a serving general packet radio services support node (SGSN) that supports the S4 interface (e.g., referred to as an S4-SGSN) and EIR 108.

In some embodiments, network node 102 may receive, from a message originator, a request (e.g., a signaling message request) to check the identity and/or identification number of UE 101 (e.g., any mobile phone, mobile tablet, or other like mobile device capable of wireless communications) at either of its two interfaces 104 or 106. As illustrated in FIG. 1, UE 101 may attempt to establish a communications connection (e.g., to register, attach, initiate a call/text, etc.) with MSC 110 via a base station (not shown). Accordingly, MSC 110 may be configured to send a request message 120 (e.g., a GSM MAP Check_IMEI message) to network node 102 via an SS7 link communicatively connecting (either directly or indirectly) MSC 110 to first interface 104 (e.g., an SS7 interface). In some embodiments, request message 120 may contain an identity of UE 101 (e.g., the IMEI value). In some embodiments, request message 120 may also include a subscriber identifier. In the embodiment illustrated in FIG. 1, for example, request message 120 includes an international mobile subscriber identity (IMSI) of the user associated with UE 101. For GSM phones, the IMEI is stored in integrated hardware components (e.g., on a logic board chip) of UE 101 while the IMSI is stored in a subscriber identity module, or SIM card, utilized by UE 101. In some embodiments, MSC 110 may send request message 120 in response to an initial attachment or registration of UE 101 to the network, or in response to other trigger conditions, such as a receiving a location update, receiving other MAP requests, and the like. The sending of request message 120 may also be triggered if the movement of UE 101 requires an inter-MSC handover, if UE 101 receives or originates a call, and/or if the UE receives or originates an SMS message (e.g., a text message) or MMS message).

Supporting EIR requests of different protocols allows network node 102 to provide the capability that a UE device that is blacklisted in a network that uses the first protocol is also blacklisted in a network that uses the second protocol. For example, if a dual mode mobile phone that can operate in both 3G and 4G networks is stolen, and the 3G network operator adds that UE device to a blacklist maintained in EIR 108, then not only will the stolen device be barred from operation in the 3G network, the stolen device will also be barred from operating in a 4G network as well. Returning to FIG. 1, network node 102 receives request message 120 from MSC 110 and, in response, EIR service module 114 may be configured to send an associated query message 122 to EIR 108. For example, SS7-based message 120 may be a "route on SSN" message, in which case network node 102 can determine if the destination SSN included in message 120 is the same as the SSN assigned to a server hosting an EIR database (e.g., EIR 108). If so, EIR service module 114 may enable network node 102 to conduct the EIR query itself by generating and sending message 122 to EIR 108. If received message 120 is a "route on global title translation" message, EIR service module 114 on network node 102 may first check the service field of message 120 to determine if the service indicator="EIR". If such a determination is made, network node 102 may perform the EIR query by sending message 122 to EIR 108 as shown in FIG. 1.

Upon receiving query message 122, EIR 108 (e.g., the server hosting EIR 108) may determine if UE 101 is included as an entry in the EIR 108. Specifically, EIR 108 may utilize the IMEI provided in received message 122 to cross-reference entries listed in the blacklists, whitelists, and/or greylists included in EIR 108.

In some embodiments, EIR 108 receives a query message 122, such as a Check_IMEI query containing the IMEI (and optionally the IMSI also) and responds with restriction data that provides an indication as to whether to allow the associated UE to attach to the network or not. For example, the restriction data may include information that indicates whether UE 101 is "blacklisted", "whitelisted", and/or "greylisted". As used herein, a "blacklisted" device can include a UE device which EIR 108 reports as being prohibited from attaching to or using the network. UE devices can be blacklisted for a variety of reasons, the most common being that the UE was stolen from its rightful owner, who reported the theft to the networks. Blacklisting is intended to discourage theft of cell phones, since the stolen phone will, in theory, be quickly barred from use on the network. Likewise, as used herein, a "whitelisted" device includes a UE device which EIR 108 reports as being allowed to attach to and use the network. Similarly, a "greylisted" device is a UE device which FIR 108 reports as being allowed to attach to and use the network, but which EIR 108 flags as being suspicious and/or worthy of further observation. For example, if result message 126 in FIG. 1 includes restriction data indicating that UE 101 is greylisted, MSC 110 may subsequently notify the network operator of the presence of the greylisted device on the network, or initiate actions to monitor or track UE 101.

Returning to the embodiment of FIG. 1, upon locating restriction data that indicates whether UE 101 is blacklisted, whitelisted, and/or greylisted, EIR 108 can send a response message 124, which contains the result/response to query 122, to network node 102. EIR service module 114 in network node 102 subsequently sends the received restriction data result (illustrated as response message 126) back to the original requesting node, i.e., MSC 110.

Notably, this situation is complicated by the fact that a single UE may be a multi-mode device that includes multiple different SIM cards, such that a UE's single IMEI may be associated with multiple IMSIs (corresponding to the different SIM cards). For this reason, EIR 108 may be configured such that, if an IMEI query results in finding restriction data that indicates UE 101 as being blacklisted, EIR 108 may additionally check the IMSI value provided by network node 102 as well. If EIR 108 determines that the IMSI value is valid, EIR 108 may report UE 101 as being whitelisted (e.g., the restriction data may include a null value or other similar indication). Thus, in such an embodiment, a blacklisted IMEI may be overridden by a finding that an IMSI associated with UE 101 is whitelisted.

Figure 2:
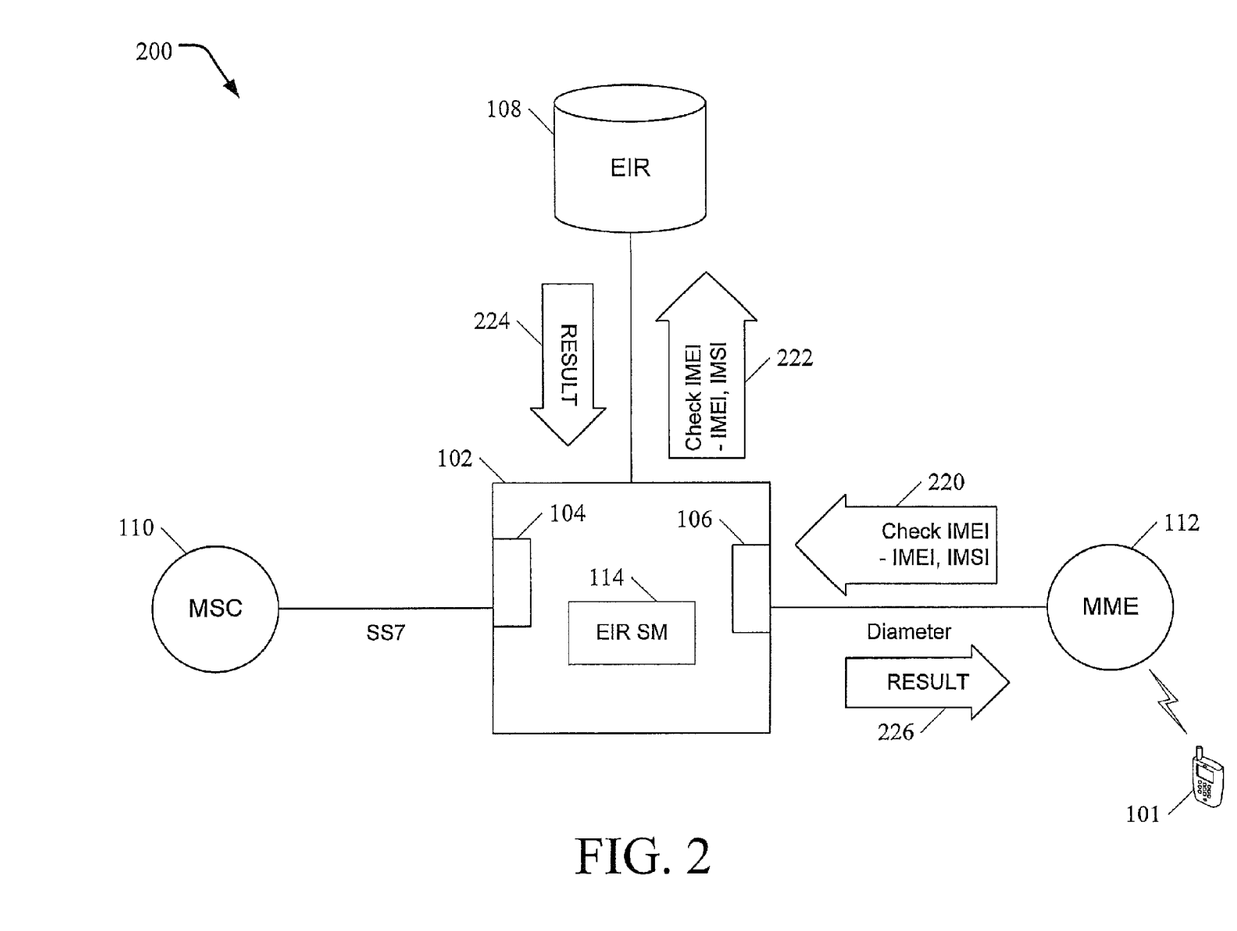
FIG. 2 is a block diagram illustrating an exemplary system for providing a multi-network EIR service in response to receiving Diameter based signaling messages according to an embodiment of the subject matter described herein.

FIG. 2 is a block diagram illustrating an exemplary system for providing a multi-network EIR service in response to receiving a Diameter based message according to an embodiment of the subject matter described herein. For example, FIG. 2 depicts the same system 100 shown in FIG. 1 but instead illustrates the communication between MME 112 and network node 102. Notably, network node 102's second interface 106 allows network node 102 to provide EIR services to other networks that utilize other types of protocols as well. In the embodiment illustrated in FIG. 2, network node 102 may comprise an STP within an SS7 network that includes a second interface 106 compatible with the Diameter protocol, thereby allowing non-GSM network elements (e.g., network elements that use Diameter protocol rather than SS7) to access EIR 108. In the embodiment illustrated in FIG. 2, for example, MME 112 may be triggered to send a Diameter protocol message 220 (e.g., a Check_IMEI" message) to check an identity of UE 101, wherein message 220 is received by network node 102's Diameter interface (i.e., interface 106). In response, EIR service module 114 in network node 102 generates and sends a query message 222 to EIR 108. Upon receiving query message 222, EIR 108 may determine if UE 101 is included as an entry in its databases. Specifically, EIR 108 may utilize the IMEI provided in received message 222 to cross-reference entries listed in the blacklists, whitelists, and/or greylists included in EIR 108. After determining if the IMEI is blacklisted, whitelisted, and/or greylisted, EIR 108 may send the determined restriction data result via response message 224 back to network node 102. Network node 102, in turn, sends the restriction data result via message 226 to the original querying node, MME 112. In one embodiment, MME 112 or other Diameter nodes may establish a session with network node 102 for the purpose of performing Check_IMEI queries.

In the embodiments illustrated in FIGS. 1 and 2, network node 102 receives a query result from EIR 108 and forwards that result to the node which sent the original query (i.e., MSC 110 in FIG. 1 and MME 112 in FIG. 2), but in alternative embodiments, node 102 may modify the result from EIR 108 before sending the message on or generate a new message and send that modified message instead. Likewise, although FIGS. 1 and 2 perform queries using an IMEI and optionally an IMSI, other types of identifiers could be used, such as a Mobile Subscriber Integrated Services Digital Network-Number (MSISDN), and the like.

Figure 3:
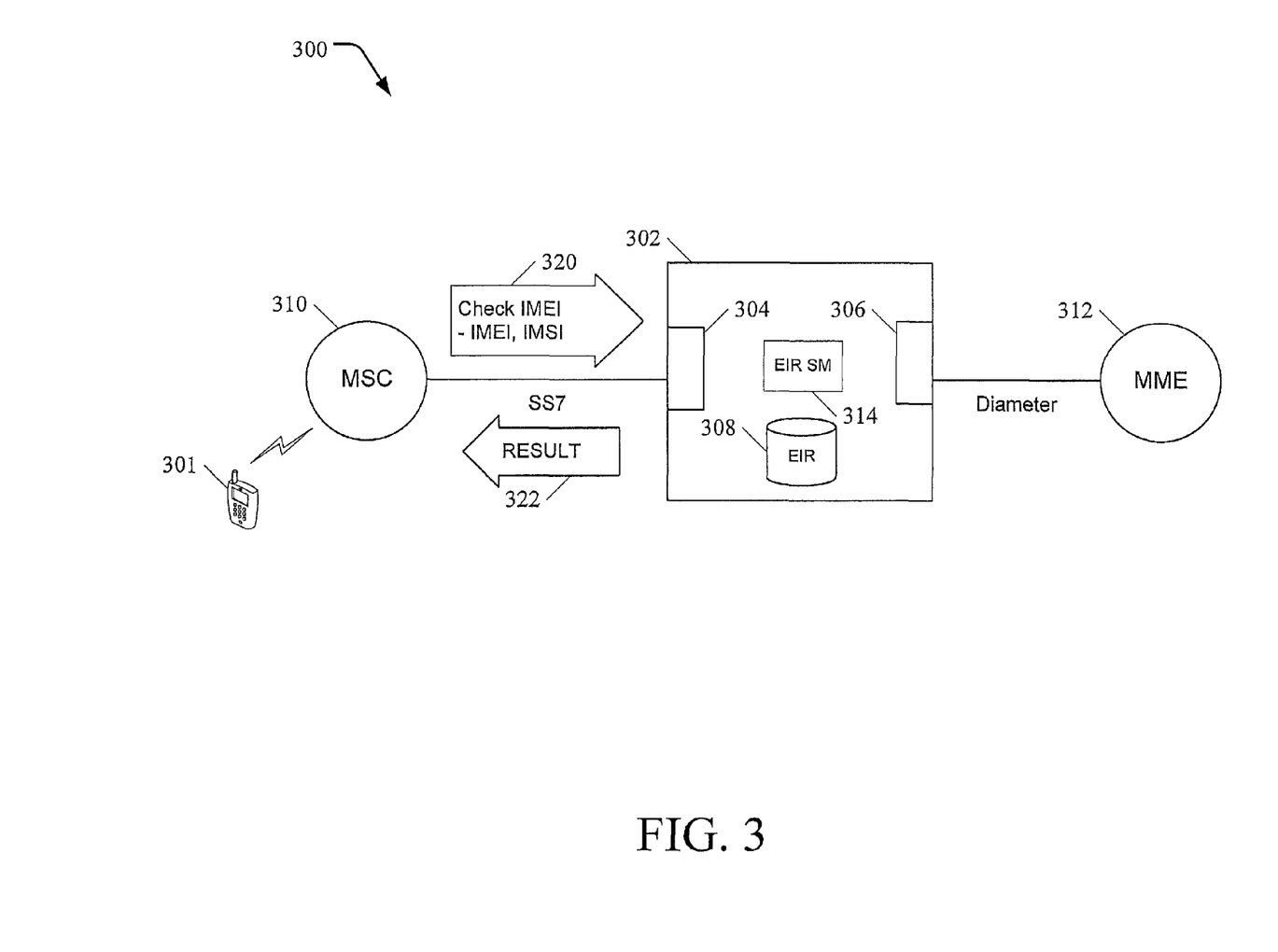
FIG. 3 is a block diagram illustrating an exemplary system for providing a multi-network EIR service via utilization of a local EIR database provisioned on a network node according to an embodiment of the subject matter described herein.

While FIGS. 1 and 2 depict EIR 108 as being a network element that is separate from network node 102, some embodiments of the disclosed subject matter may include the EIR being co-located with, or a component of, network node 102. For example, FIG. 3 depicts a system 300 that includes a network node 302 in a telecommunications network that includes a first interface 304 for receiving requests to check an identity of a UE in a first protocol and a second interface 306 for receiving requests to check an identity of a UE in a second protocol, wherein the first protocol and second protocol are distinct and different from each other. Although FIG. 3 depicts network node 302 as supporting two protocols via two network interfaces, additional protocols and/or interfaces may be utilized without departing from the scope of the disclosed subject matter. Notably, system 300 of FIG. 3 is similar to system 100 illustrated in FIG. 1 with the exception that the EIR database is maintained and hosted by network node 302 (i.e., the EIR is not externally located from network node 302).

For example, network node 302 may receive, from a message originator, a request (e.g., a signaling message request) to check the identity of UE device 301 (e.g., any mobile phone, mobile tablet, or other like mobile device capable of wireless communications) at interface 104. As illustrated in FIG. 3, MSC 310 may be configured to send a request message 320 (e.g., a GSM MAP Check_IMEI message) to network node 302 via an SS7 link communicatively connecting (either directly or indirectly) MSC 310 to first interface 304 (e.g., an SS7 interface). In some embodiments, request message 320 may contain an identity of the user equipment (e.g., the UE's IMEI value). In some embodiments, request message 320 may also include a subscriber identifier (e.g., IMSI) of the user associated with UE 301.

Upon network node 302 receiving request message 320 from MSC 310, EIR service module 314 may be configured to decode message 320 and access local EIR 308 in order to obtain the desired EIR information (i.e., without utilizing any external signaling messages). For example, EIR 308 may utilize the IMEI provided in received message 320 to cross-reference entries listed in the blacklists, whitelists, and/or greylists included in EIR 308. After obtaining the desired EIR information (e.g., blacklist, whitelist, and/or greylist restriction data) associated with the IMEI, EIR service module 314 in network node 302 may be configured to generate and send a result message 322 containing the determined restriction data to the original querying node, MSC 310.

Figure 4:
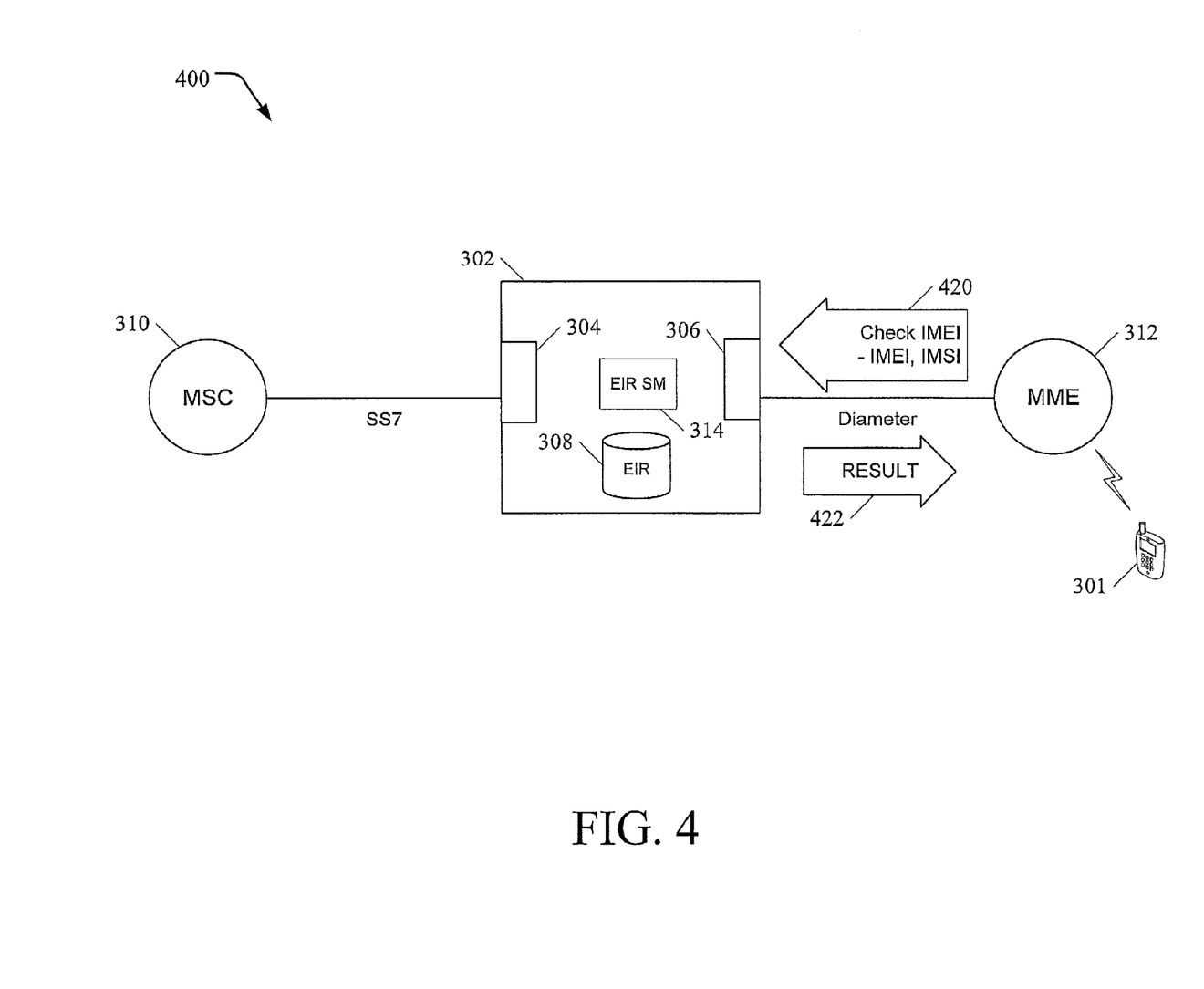
FIG. 4 is a block diagram illustrating an exemplary system for providing a multi-network EIR service in response to receiving Diameter based signaling messages via utilization of a local EIR database provisioned on a network node according to an embodiment of the subject matter described herein.

FIG. 4 is a block diagram illustrating an exemplary system for providing a multi-network EIR service in response to receiving Diameter based signaling messages via utilization of a local EIR database provisioned on a network node according to an embodiment of the subject matter described herein. Notably, system 400 of FIG. 4 is similar to system 200 illustrated in FIG. 2 with the exception that the EIR database is maintained and hosted by network node 302 (i.e., the EIR is not externally located from network node 302). For example, network node 302 may receive, from a message originator, a request (e.g., a signaling message request) to check the identity of UE 101 at interface 104. As illustrated in FIG. 4, MME 312 may be configured to send a request message 420 (e.g., a GSM MAP Check_IMEI message) to network node 302 via an SS7 link communicatively connecting (either directly or indirectly) MME 312 to first interface 404 (e.g., a Diameter interface). In some embodiments, request message 420 may contain an identity of the user equipment (e.g., the UE's IMEI value). In some embodiments, request message 320 may also include a subscriber identifier (e.g., IMSI) of the user associated with UE 301.

Upon network node 302 receiving request message 320 from MME 312, EIR service module 314 may be configured to decode message 320 and access local EIR 308 in order to obtain the desired EIR information (i.e., without utilizing any external signaling messages). For example, EIR service module 314 may utilize the IMEI provided in received message 420 to cross-reference entries listed in the blacklists, whitelists, and/or greylists included in EIR 308. After obtaining the desired EIR information (e.g., blacklist, whitelist, and/or greylist restriction data) associated with the IMEI, EIR service module 314 in network node 302 may be configured to generate and send a result message 422 containing the determined restriction data to the original querying node, MME 312.

Figure 5:
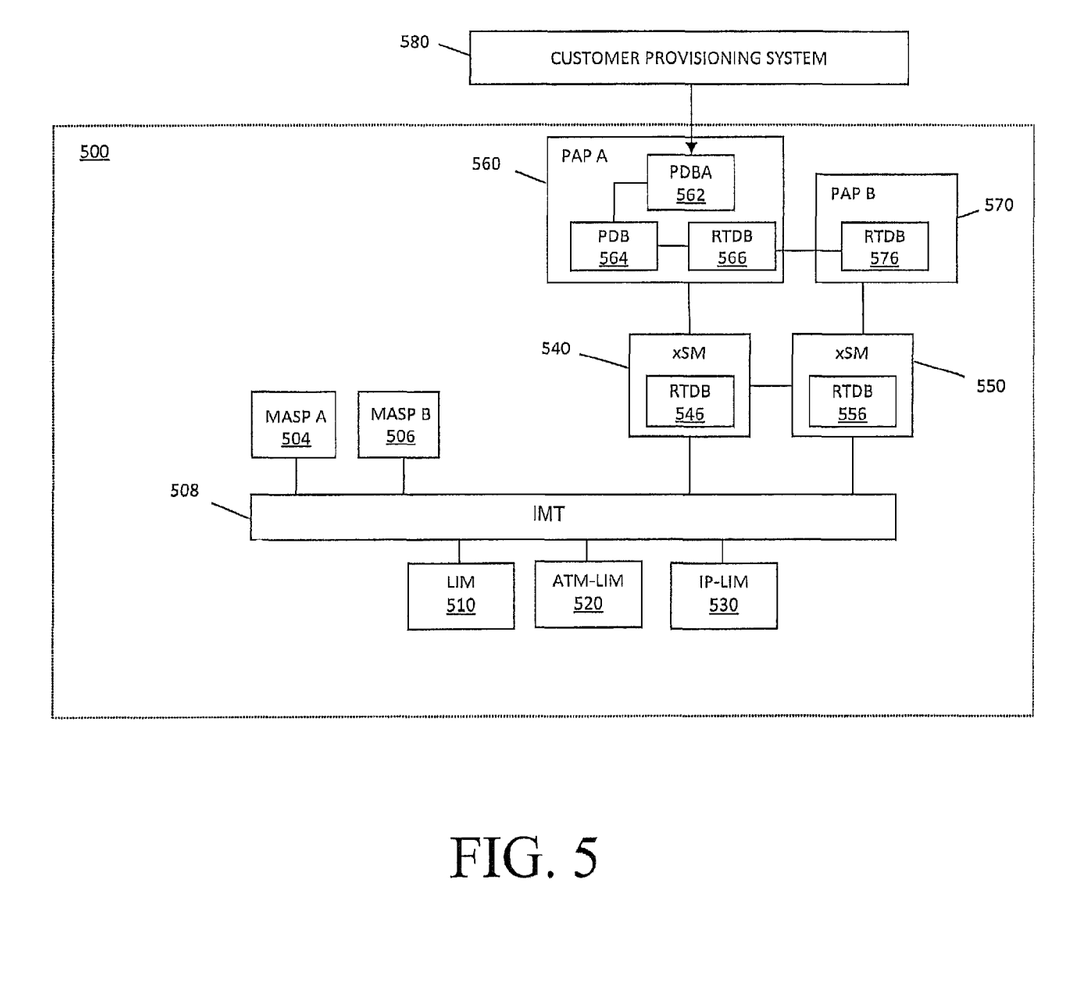
FIG. 5 is a block diagram illustrating an exemplary internal architecture of a network node configured to provide a multi-network EIR service according to an embodiment of the subject matter described herein.

FIG. 5 is a block diagram of an exemplary internal architecture of a network node 500 according to an embodiment of the subject matter described herein. In some embodiments, network node 500 may include a signaling transfer point (STP) or any other signaling message routing node. Referring to FIG. 5, network node 500 may include an interprocessor message transport (IMT) bus 508 that includes two counter-rotating serial rings. A number of processing modules or cards may be coupled to IMT bus 508. For example, IMT bus 508 may be coupled to a number of communications modules, such as a link interface module (LIM) 510, an asynchronous transfer mode LIM (ATM-LIM) 520, and an Internet protocol LIM (IP-LIM) 530. These modules are physically connected to bus 508 such that signaling and other types of messages may be routed internally between active cards or modules. For simplicity of illustration, only a single LIM card, a single ATM-LIM card, and a single IP-LIM card are included in FIG. 5. However, network node 500 may include multiple LIMs, data communication modules, and other card types, all of which may be simultaneously connected to and communicating via IMT bus 508.

In some embodiments, network node 500 may also include a pair of a pair of MASP processor modules 504-506 communicatively connected to IMT bus 508. Notably, MASP processor modules 504-506 may be configured implement maintenance and administration subsystem functions, such as maintenance communications, initial program loading, peripheral services, alarm processing, and system disk functionality, for network node 500.

In some embodiments, network node 500 may include a plurality of service modules (xSMs) 540-550 that are communicatively connected via IMT bus 508. Service module 540, for example, may comprise a database services module (DSM) that is configured to host one or more signaling message processing applications, such as a multi-network EIR service, global title translation (GTT), flexible routing, number portability translation, ENUM, call screening, pre-paid calling service, mobile services, 800 number service, caller identification service, and other applications that involve routing or application layer signaling message processing. In some embodiments, LIMs 510-530, xSMs 540-550, and other processor modules may be provisioned and operated simultaneously within network node 500, so as to form a highly scalable, reliable message processing system. Notably, each of modules 510-550 may execute applications or functions that reside on each module and control communication with other modules via bus 508. For example, xSM 540 may execute software (e.g., via a processor or the like) that applies the aforementioned EIR service to communications sessions involving a mobile originating or terminating device.

In some embodiments, a multi-network EIR may be stored in a service module (e.g., xSM 540 or 550) which is provisioned by a customer provisioning system or application, generally designated 580. For example, customer provisioning system 580 may be configured to communicate with a primary provisioning application processor (PAP) 560 included in network node 500. Notably, customer provisioning system 580 may communicate write and read instructions with a provisioning database application (PDBA) 562 included in PAP 560 via a provisioning database interface (PDBI). In some embodiments, the PDBI may comprise a transaction based interface over a Simple TCP/IP socket connection.

PAP 560 may further include a provisioning database (PDB) 564 and a real time database (RTDB) 566. In some embodiments, PDB 564 may be executed on a blade based PAP server and includes a readable and secure master copy of an EIR database. Similarly, RTDB 566 comprises a database that may include a reorganization of the data contained in PDB 564. For example, the data in RTDB 566 may be organized in a manner that improves and/or optimizes data lookups for the benefit of network node 500. In some embodiments, PAP 560 may be duplicated for redundancy and replicated on a mated node (not shown). For example, a backup PAP 570 may contain a RTDB 576 that stores a binary copy of RTDB 566.

In some embodiments, customer provisioning system 580 may be configured by a network operator to provision network node 502. For example, system 580 may initiate a write transaction to communicate write operation commands to PDBA 562 via the PDBI. Upon receiving and processing the commands, PDBA 562 closes the write transaction. In some embodiments, PDBA 562 accepts/commits any commands determined to be valid while rejecting any commands identified as being invalid. PDBA 562 may subsequently communicate a response message to customer provisioning system 580 to indicate which commands were accepted and/or rejected. In some embodiments, PDBA 562 utilizes data from the write transaction to securely update PDBA 562 and RTDBs 566 and 576. Similarly, PDBA 562 may also be configured to utilize data from the write transaction to securely update a PDB and/or a RTDB in a mated node. After these databases are updated, PDBA 562 (using RTDB 566) may be configured to broadcast the updated information to RTDB 546-556 stored in SM 540-550 in a parallel manner.

Figure 6:
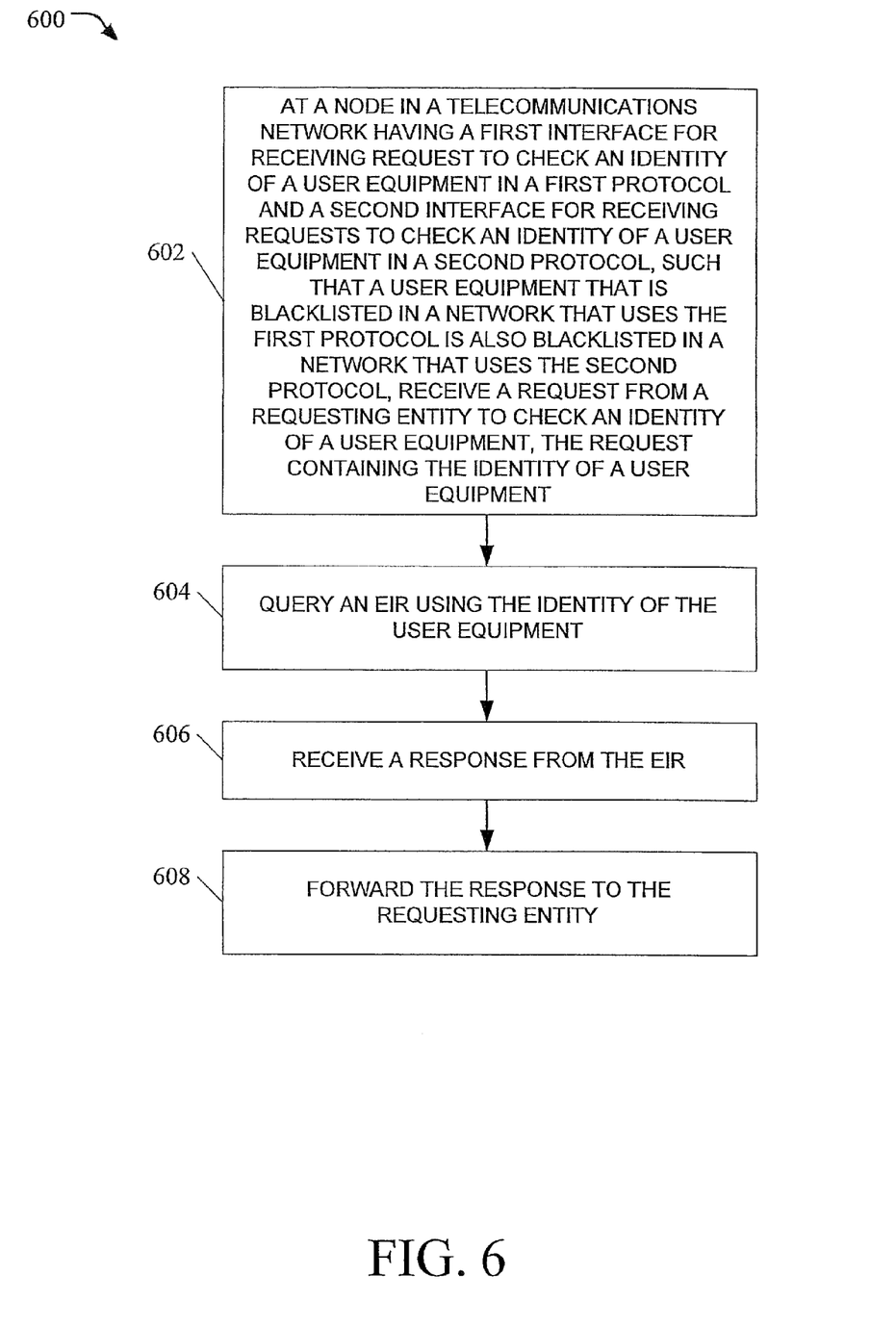
FIG. 6 is a flow chart illustrating an exemplary process for providing a multi-network EIR service according to another embodiment of the subject matter described herein.

FIG. 6 is a flow chart illustrating an exemplary method 600 for providing a multi-network EIR service according to another embodiment of the subject matter described herein. In the embodiment illustrated in FIG. 6, method 600 includes, at step 602, receiving, at a node in a telecommunications network having a first interface for receiving requests to check an identity of a user equipment in a first protocol and a second interface for receiving requests to check an identity of a user equipment in a second protocol, a request from a requesting entity to check an identity of a user equipment, the request containing an identity of a user equipment. At step 604, the identity of the user equipment is used to query an EIR. At step 606, a response to the query is received from the EIR. At step 608, the response is forwarded to the requesting party.

The methods and systems described herein include several advantages over conventional systems. For example, for GSM network operators that have an existing EIR database, the systems and methods described herein allow them to make the EIR database available to 4G networks, either their own 4G network or a 4G network owned by another operator. By doing this, the 4G vendor does not need to create its own EIR database, but can instead reuse or take advantage of a legacy EIR database.

By making a single EIR database available to multiple networks, when a device having multiple radio interfaces (GSM, LTE, etc.) is stolen and reported to the network operator, an entry for that device is placed in EIR 108—which means that, regardless of the network that thief attempts to use, the device will be properly flagged as being blacklisted. In contrast, conventional systems maintained EIR databases for each type of network, which meant that it was possible that a device might be blacklisted in a GSM network but not blacklisted in an LTE network, for example.

Figure 7:
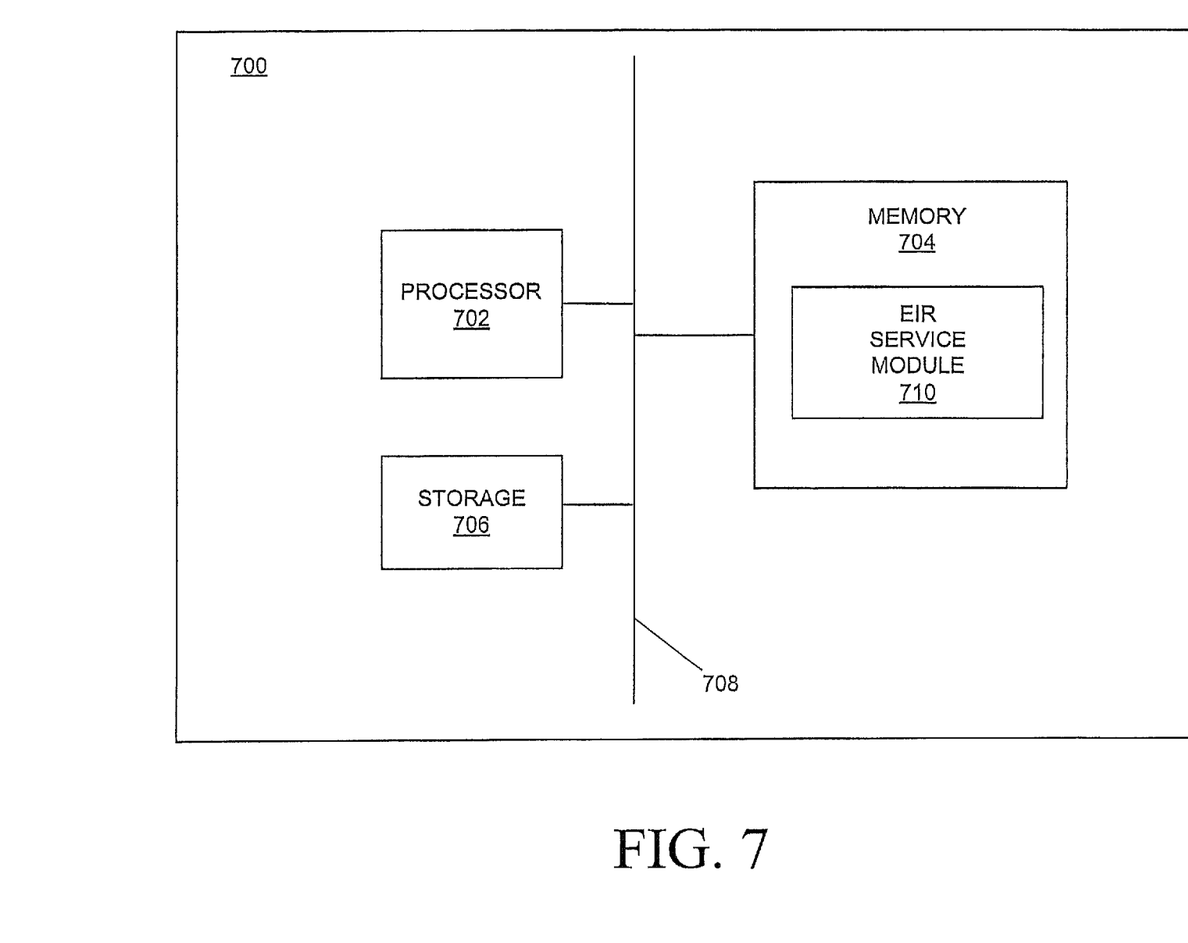
FIG. 7 is a high level block diagram of a general purpose computer system suitable for use in providing multi-network EIR service according to an embodiment of the subject matter described herein.

FIG. 7 depicts a high level block diagram of a general purpose computer system suitable for use in performing the functions described herein. As depicted in FIG. 7, system 700 comprises a processor 702, a memory 704, a storage device 706, and communicatively connected via a system bus 708. In some embodiments, processor 702 can comprise can comprise a microprocessor, central processing unit (CPU), or any other like hardware based processing unit. In some embodiments, an EIR service module 710 can be stored in memory 704, which can comprise random access memory (RAM), read only memory (ROM), optical read/write memory, cache memory, magnetic read/write memory, flash memory, or any other non-transitory computer readable medium. In some embodiments, processor 702 and memory 704 can be used to execute and manage the operation of EIR service module 710. In some embodiments, storage device 706 can comprise any storage medium or storage unit that is configured to store data accessible by processor 702 via system bus 708. Exemplary storage devices can comprise one or more local databases hosted by system 700.

In some embodiments, the disclosed subject matter includes a system for providing a multi-network equipment identity register (EIR) that comprises a network node in a telecommunications network that is configured to:

receive, from a requesting entity, an identity check request message containing an identity of a user equipment;

query an FIR using the identity of the user equipment to determine if any restriction data corresponding to the user equipment exists in the EIR; and forward the existing restriction data to the requesting entity, wherein the network node includes a first interface for receiving identity check request messages to check the identity of the user equipment in a first protocol and a second interface for receiving identity check request messages to check the identity of the user equipment in a second protocol, wherein if the existing restriction data indicates that the use of the user equipment is restricted in a network that uses the first protocol, the user equipment is similarly restricted in a network that uses the second protocol.

In some embodiments of the aforementioned system, the EIR comprises an EIR database located within the network node.

In some embodiments of the aforementioned system, the EIR database is provisioned with restriction data by a customer network provisioning system.

In some embodiments of the aforementioned system, the EIR comprises an EIR database that is hosted by a network element that is distinct and separate from the network node.

In some embodiments of the aforementioned system, the restriction data includes blacklist data, greylist data, and/or whitelist data.

In some embodiments of the aforementioned system, the requesting entity sends the identity check request message in response to at least one of: receiving a registration request from the user equipment, receiving a network attachment request from the user equipment, receiving a location update message from the user equipment, receiving a message attempting to initiate a call from the user equipment, receiving a message attempting to send a short message service (SMS) message from the user equipment, or receiving a mobile terminated message directed to the user equipment.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing a multi-network equipment identity register (EIR), the system comprising:
a node in a telecommunications network configured to:
receive from a requesting entity a request to check an identity of a user equipment, the request containing the identity of the user equipment;
query an EIR using the identity of the user equipment;
receive a response from the EIR; and
forward the response to the requesting entity,
wherein the node includes a first interface for receiving an identity check request to check an identity of user equipment in a first protocol and a second interface for receiving an identity check request to check an identity of user equipment in a second protocol, the second protocol being different from the first protocol and the identity of the user equipment in the second protocol being different from the identity of the user equipment in the first protocol, such that user equipment blacklisted in a network that uses the first protocol is also blacklisted in a network that uses the second protocol.

2. The system of claim 1 wherein the node comprises a signaling transfer point (STP).

3. The system of claim 1 wherein the identity of the user equipment comprises an international mobile station equipment identity (IMEI).

4. The system of claim 3 wherein the request to check the identity of the user equipment comprises a Check IMEI message.

5. The system of claim 1 wherein the request to check the identity of the user equipment also contains an international mobile subscriber identity (IMSI).

6. The system of claim 1 wherein the first interface is an SS7 interface for sending and receiving SS7 protocol messages.

7. The system of claim 6 wherein the request to check the identity of the user equipment comprises a global system for mobile communications (GSM) mobile application part (MAP) protocol message or an IS-41 MAP protocol message.

8. The system of claim 1 wherein the second interface is a Diameter interface for sending and receiving Diameter protocol messages.

9. The system of claim 8 wherein the second interface is a Diameter S13 interface or a Diameter S13' interface.

10. The system of claim 8 wherein the request to check the identity of the user equipment comprises a Diameter protocol message.

11. A method for providing a multi-network equipment identity register (EIR), the method comprising:
   at a node in a telecommunications network:
      receiving from a requesting entity a request to check an identity of a user equipment, the request containing the identity of the user equipment;
      querying an EIR using the identity of the user equipment;
      receiving a response from the EIR; and
      forwarding the response to the requesting entity,
      wherein the node includes a first interface for receiving an identity check request to check an identity of user equipment in a first protocol and a second interface for receiving an identity check request to check an identity of user equipment in a second protocol, the second protocol being different from the first protocol and the identity of the user equipment in the second protocol being different from the identity of the user equipment in the first protocol, such that user equipment blacklisted in a network that uses the first protocol is also blacklisted in a network that uses the second protocol.

12. The method of claim 11 wherein the node comprises a signaling transfer point (STP).

13. The method of claim 11 wherein the identity of the user equipment comprises an international mobile station equipment identity (IMEI).

14. The method of claim 11 wherein the request to check the identity of the user equipment comprises a Check IMEI message.

15. The method of claim 11 wherein the request to check the identity of the user equipment contains an international mobile subscriber identity (IMSI).

16. The method of claim 11 wherein the first interface is an SS7 interface for sending and receiving SS7 protocol messages.

17. The method of claim 16 wherein the request to check the identity of the user equipment comprises a global system for mobile communications (GSM) mobile application part (MAP) protocol message or an IS-41 MAP protocol message.

18. The method of claim 11 wherein the second interface is a Diameter interface for sending and receiving Diameter protocol messages.

19. The method of claim 18 wherein the request to check the identity of the user equipment comprises a Diameter protocol message.

20. A non-transitory computer readable medium having stored thereon executable instructions that when executed by the processor of a computer control the computer to perform steps comprising:
   at a node in a telecommunications network:
      receiving from a requesting entity a request to check an identity of a user equipment, the request containing the identity of the user equipment;
      querying an equipment identity register (EIR) using the identity of the user equipment;
      receiving a response from the EIR; and
      forwarding the response to the requesting entity,
      wherein the node includes a first interface for receiving an identity check request to check an identity of user equipment in a first protocol and a second interface for receiving an identity check request to check an identity of user equipment in a second protocol, the second protocol being different from the first protocol and the identity of the user equipment in the second protocol being different from the identity of the user equipment in the first protocol, such that user equipment blacklisted in a network that uses the first protocol is also blacklisted in a network that uses the second protocol.

* * * * *